US00RE36738E

United States Patent [19]

Matsumiya et al.

[11] E Patent Number: Re. 36,738

[45] Reissued Date of Patent: Jun. 20, 2000

[54] SELECTIVE MULTIPLE POSITION SWITCH WITH COMMON PIVOTED OPERATOR

[75] Inventors: Hiroshi Matsumiya, Tokyo; Takeki Sugiyama, Shimizu, both of Japan

[73] Assignee: Sega Enterprises, Ltd., Tokyo, Japan

[21] Appl. No.: 08/794,603

[22] Filed: Feb. 3, 1997

Related U.S. Patent Documents

Reissue of:

[64] Patent No.: 5,396,030
Issued: Mar. 7, 1995
Appl. No.: 08/098,435
Filed: Jul. 28, 1993

[30] Foreign Application Priority Data

Jul. 31, 1992 [JP] Japan ..... 4-059472 U
Oct. 26, 1992 [JP] Japan ..... 4-080210 U

[51] Int. Cl.[7] ..... H01H 25/04

[52] U.S. Cl. ..... 200/6 A; 200/5 A; 200/339

[58] Field of Search ..... 200/5 R, 5 A, 200/512–517, 553, 557, 339, 6 A, 17 R, 18; 463/37, 38; 345/161, 168, 169

[56] References Cited

U.S. PATENT DOCUMENTS

| | | | |
|---|---|---|---|
| 4,246,452 | 1/1981 | Chandler | 200/5 A |
| 4,256,931 | 3/1981 | Palisek | 200/5 A |
| 4,349,708 | 9/1982 | Asher | 200/6 A |
| 4,408,103 | 10/1983 | Smith, III | 200/6 A |
| 4,414,438 | 11/1983 | Maier et al. | 200/6 A |
| 4,439,648 | 3/1984 | Reiner et al. | 200/6 A |
| 4,486,629 | 12/1984 | Sledesky | 200/6 A |
| 4,511,769 | 4/1985 | Sahakian et al. | 200/6 A |
| 4,614,847 | 9/1986 | Sasao | 200/6 A |
| 4,687,200 | 8/1987 | Shirai | 200/5 A X |
| 4,733,024 | 3/1988 | Takeshima et al. | 200/6 R |
| 4,896,003 | 1/1990 | Hsieh | 200/6 A |
| 4,947,461 | 8/1990 | Yoshioka et al. | 200/5 R |
| 4,992,631 | 2/1991 | Gee | 200/5 A |
| 5,283,401 | 2/1994 | Schmucker | 200/6 A |
| 5,396,030 | 3/1995 | Matsumiya et al. | 200/6 A |

FOREIGN PATENT DOCUMENTS

| | | | |
|---|---|---|---|
| 53-95172 | 12/1976 | Japan . | |
| 54-121379 | 9/1979 | Japan . | |
| 58-176822 | 10/1983 | Japan | H01H 25/04 |
| 59-33641 | 3/1984 | Japan | H01H 25/04 |
| 63-52234 | 9/1986 | Japan | H01H 23/30 |
| 63-66811 | 9/1986 | Japan | H01H 25/04 |
| 62-92535 | 6/1987 | Japan | H01H 23/30 |
| 63-20336 | 2/1988 | Japan . | |
| 63-66811 | 3/1988 | Japan . | |
| 63-52234 | 4/1988 | Japan . | |
| 63-137427 | 9/1988 | Japan | H01H 25/04 |
| 3-13951 | 3/1991 | Japan . | |

*Primary Examiner*—J. R. Scott
*Attorney, Agent, or Firm*—Eugene Lieberstein; Michael N. Meller

[57] ABSTRACT

A tilting member has a force bearing portion to which operating force is applied, and a supported surface. A supporting member has a supporting projection with which the supported surface of the tilting member may come in contact. When the operating force is applied to the tilting member, the tilting member tilts with respect to the supporting member. The supporting member supports the tilting member at a supporting point where the supporting projection of the supporting member is in contact with the supported surface of the tilting member, about which supporting point the tilting member tilts. The tilting of the tilting member, with respect to the supporting member, establishes a predetermined electrical contact.

21 Claims, 4 Drawing Sheets

SELECTIVE MULTIPLE POSITION SWITCH WITH COMMON PIVOTED OPERATOR

Matter enclosed in heavy brackets [ ] appears in the original patent but forms no part of this reissue specification; matter printed in italics indicates the additions made by reissue.

BACKGROUND OF THE INVENTION

The present invention relates to a control-key mechanism.

In the known art, a kind of control-key mechanism is used, such as, in computers, for example, video game apparatus including video game apparatus of business use or video game apparatus of personal use. In these video game apparatuses, a display screen such as using a liquid crystal display device is provided. In this display screen, a character is moved in response to an operation performed on the video game apparatus by an operator. The character is an object represented on the display screen. The operator may specify the movement of the character using the control-key mechanism such as that mentioned above.

Using the control-key mechanism, the operator may specify or may select a direction in which the character moves. The direction selected is selected from various directions, for example, 4 directions on the screen, that is, the top, bottom, right and left, or 8 directions, the top, bottom, right, left, top left, top right, bottom left, and bottom right.

Such a control-key mechanism has a construction such that the operator may control the character, via the control-key mechanism with very small force being applied to the control-key mechanism by the operator's finger so as to control, for example, the movement of the above-mentioned character displayed on the screen. This is because, for example, the operator has to control the movement of the character very frequently. Thus, if this control needed a relatively large force, the operator's finger would become tired.

The Japanese Utility-Model Publication No. 3-13951 corresponding to U.S. Pat. No. 4,687,200, discloses such a conventional control-key mechanism. This conventional control-key mechanism has a key top. A half-spherical shaped projection projects downward from a center of a bottom surface of the key top. The control-key mechanism also has a circuit substrate. In the control-key mechanism, there exists a small space between the top of the half-spherical shaped projection and the circuit substrate.

A elastic supporting member is provided so as to support a disc portion formed on the periphery of the bottom surface of the key top so that the key top is supported on the circuit substrate. Thus, the above-mentioned small space is maintained.

When the operator pushes, in a certain direction, the key top of the above-mentioned conventional control-key mechanism, the top of the half-sphere shaped projection comes in contact with the substrate. Thus, the portion where the top of the half-sphere shaped projection comes in contact with the substrate will act as a supporting point to be used for a seesaw-like movement of the key top on the substrate.

Depending on the direction in which the control-key is being pushed, the key top is tilted in a corresponding direction with the above-mentioned seesaw-like movement using the supporting point. This tilting of the key top causes a conductive rubber, provided on the bottom surface of the supporting member, to come in contact with a plurality of contacts provided on the circuit substrate. This coming in contact with the plurality of contacts, that is, a short-circuiting of the plurality of contacts results in forming a corresponding circuit on the circuit substrate.

In this construction of the conventional control-key mechanism, the following drawback may exist. When the operator operates, that is, pushes the key top in a certain direction, the top of the half-sphere shaped projection is rubbing against the circuit substrate at the portion acting as the above-mentioned supporting point to be used for the seesaw movement. This rubbing is caused by the seesaw movement of the key top on the substrate.

Such rubbing results in a corresponding friction between the top of the half-sphere shaped projection and the counterpart on the circuit substrate. Such friction may damage these rubbing parts so as to shorten a life time of the control-key mechanism.

Further, there may be a case where a relatively large mechanical shock is applied on the key top so as to cause the top of the half-sphere projection to collide with the counterpart on the circuit substrate. Such case also may damage the same parts so as also to shorten the life of the control-key mechanism.

As mentioned above, the control-key mechanism may be operated very frequently by the operator when it is applied, for example, to the video game apparatus. Such frequent operations may excessively facilitate the above-mentioned damages resulting in shortening the life of the control-key mechanism.

SUMMARY OF THE INVENTION

An object of the present invention is to provide a control-key mechanism having an improved construction in which even frequent operations will not excessively facilitate shortening the life thereof.

To achieve the object of the present invention, a control-key mechanism according to the present invention comprises:

a tilting member having a force bearing portion to which operating force is applied, which tilting member also has a supported surface; and a supporting member having a supporting projection with which said supported surface of said tilting member may come in contact; and wherein the operating force which being applied to said force bearing portion of said tilting member, causes said tilting member to tilt with respect to said supporting member while said supporting member supports said tilting member at a supporting point where said supporting projection of said supporting member is in contact with said supported surface of said tilting member, about which supporting point said tilting member tilts; and wherein the tilting of said tilting member, with respect to said supporting member, establishes a predetermined electrical contact.

By the above construction, friction occurring between the supported surface of the tilting member and the supporting projection of the supporting member can be reduced.

Other objects and further features of the present invention will become more apparent from the following detailed description when read in conjunction with the accompanying drawings.

DESCRIPTION OF THE PREFERRED EMBODIMENTS

Figure 1:
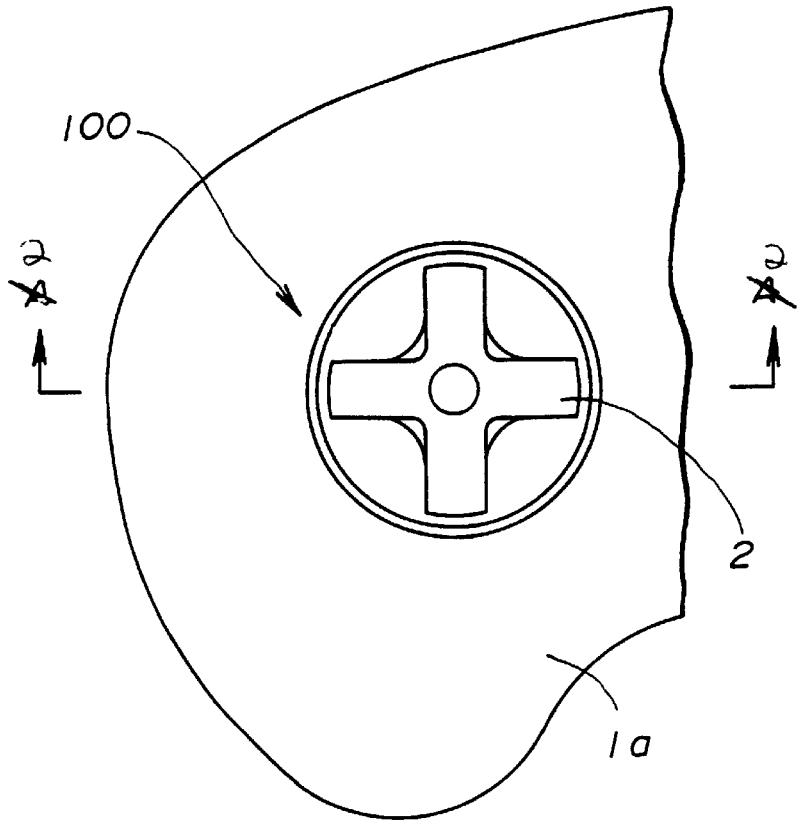
FIG. 1 shows a plan view of a control-key mechanism according to a first embodiment of the present invention.

A control-key mechanism according to the first embodiment of the present invention will now be described with reference to FIGS. 1 and 2.

An upper housing 1a and a lower housing 1b together enclose the control-key mechanism so as to protect it. The control-key mechanism 100 has a key-top member 2. A key-top member 2 comprises a key top 2a having a short cylindrical shape. The central axis of this cylindrical shape extends vertically in FIG. 2. A top of the key top 2a is exposed from the upper housing 1a through an opening 11 provided in the upper housing 1a. The key top 2a can move in the opening 11 because the inner diameter of the opening 11 is larger than the outer diameter of the key top 2a.

Figure 2:
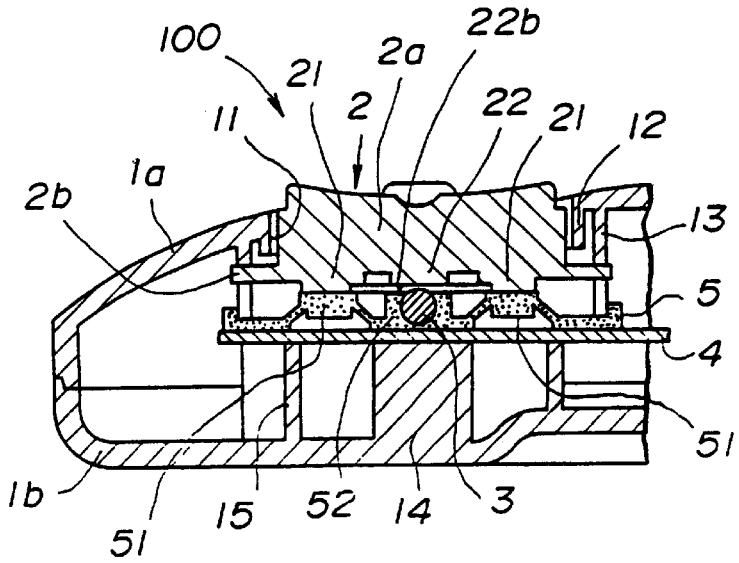
FIG. 2 shows a sectional view of the control-key mechanism shown in FIG. 1 taken along the line 2—2 in FIG. 1.

Four contact pushing portions 21, 21, 21 and 21 respectively project downward in FIG. 2 from the bottom surface of the key-top member 2. FIG. 2 shows only two contact pushing portions 21 and 21 both arranged in the left and the right in FIG. 2. The other two contact pushing portions 21 and 21 are arranged above and below the plane of the sheet on which FIG. 2 is represented. That is, the four contact pushing portions 21, 21, 21 and 21 are arranged in the top, bottom, left and right, the directions top, bottom, left and right being directions in the view shown in FIG. 1.

A supported portion 22 projects downward in FIG. 2 from the center of the bottom surface of the key-top member 2. The bottom surface 22b of the supported portion 22 has a plane shape.

The key-top member 2 also comprises a bottom peripheral disk 2b. The bottom peripheral disk 2b extends horizontally in FIG. 2 and extends peripherally from the bottom of the key-top member 2. Thus, the bottom peripheral disk 2b has a shape like a disk having a diameter larger than the diameter of the key top 2a and the disk 2b has a central axis the same as that of the cylindrical shape of the key top 2a. The bottom peripheral disk 2b is enclosed in the housings 1a and 1b.

Double ring-shape walls 12 and 13 respectively extend downward in FIG. 2 from the bottom surface of the upper housing 1a. The double ring-shape walls 12 and 13 respectively have the same central axis identical to the central axis of the key top 2a. The outer ring-shape wall 12 of the double ring-shape walls 12 and 13 has the outer diameter slightly smaller than the outer diameter of the bottom peripheral disk 2b. This outer ring-shape wall 12 has the bottom end thereof slightly lower than the bottom end of the inner ring-shape wall 13 of the double ring-shape walls 12 and 13.

The bottom end of the outer ring-shape wall 12 is in contact with the top surface of the bottom peripheral disk 2b. Thus, the outer ring-shape wall 12 prevents the key-top member 2 from escaping from the upper housing 1a through the opening 11.

Four rubber contacts 51, 51, 51 and 51 are respectively in contact with the corresponding four contact pushing portions 21, 21, 21 and 21. These rubber contacts 51, 51, 51 and 51 are respectively electrically conductive. The four rubber contacts 51, 51, 51 and 51 are parts of a elastic body 5 made of elastic material. The positions of four rubber contacts 51, 51, 51 and 51 are respectively aligned vertically in FIG. 2 with the positions of the contact pushing portions 21, 21, 21 and 21. That is, the four rubber contacts 51, 51, 51 and 51 are respectively located just under the corresponding contact pushing portions 21, 21, 21 and 21 in FIG. 2.

A supporting member 3 having a sphere shape is located just under in FIG. 2 the bottom surface 22b of the supported portion 22. The supporting member 3 is placed on a supporting portion 52 which fit a part of and located in the center of the elastic body 5. The supporting portion 52 has an approximately cylindrical shape having a concavity formed on the center of the top in FIG. 2 surface thereof. The supporting member 3 is fitted in the concavity of the supporting portion 52. The elastic body 5 is placed on a circuit substrate 4.

The supporting member 3 is preferably made of a steel ball. This is because it is easy to manufacture a precise sphere shape with steel.

A base 14 and a supporting wall 51 respectively project upward in FIG. 2 from the top surface of the lower housing 1b. The supporting wall has a shape such as encircling the base 14. The circuit substrate 4 is placed on the top surfaces of the base 14 and the supporting wall 15 so as to extend horizontally.

Four contact portions, not shown in the figures, are respectively located on the top in FIG. 2 surface of the circuit substrate 4. The positions of the four contact portions are respectively vertically in FIG. 2 aligned with the four rubber contacts 51, 51, 51 and 51. That is, the four contact portions are respectively located just under the corresponding four rubber contacts 51, 51, 51, and 51 in FIG. 2.

Downward in FIG. 2 movement of a rubber contact 51 among the four rubber contacts 51, 51, 51 and 51 results in it coming in contact with the corresponding contact portion among the above-mentioned four contact portions. The rubber contact 51 coming in contact with the contact portion establishes a corresponding electrical contact among four kinds of electrical contacts. These four kinds of electrical contacts respectively establish four corresponding kinds of electrical circuits on the circuit substrate 4.

Figure 6A:
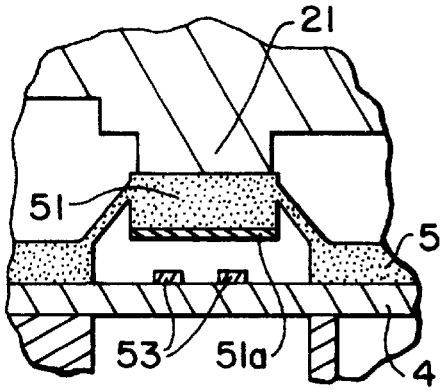
FIGS. 6A and 6B show enlarged partial side-elevational views of the structure shown in FIG. 2 with FIG. 6A showing a state in which no downward pressure is applied to the key-top member, and with FIG. 6B showing a state in which a downward pressure has been applied to the key-top member so that the conductive layer 51a comes into contact with the contacts 53, 53.
Figure 6B:
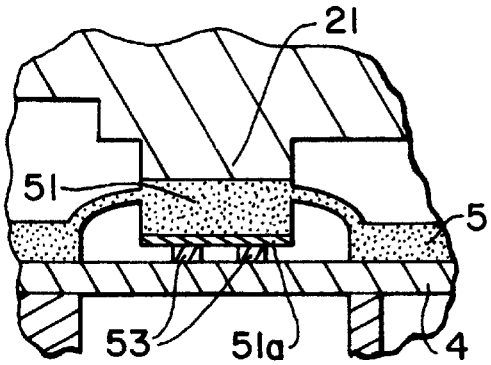

For example, as shown in FIGS. 6A and 6B, each of the four contact portions comprises two separate contacts 53, 53. Thus, the corresponding rubber contact 51 which has a conductor layer 51a on the bottom surface thereof coming in contact with the contact portion causes the corresponding two contacts to be short-circuited accordingly.

The four rubber contacts 51, 51, 51 and 51 are respectively vertically apart from the four contact portions provided on the circuit substrate 4 while no operation force is applied to the key-top member 2.

The elastic body 5 has a function resulting from its elasticity such as to push up in FIG. 2 the key-top member 2 upward. Thus, the top in FIG. 2 surface of the bottom peripheral disk 2b makes contact with the bottom surface of the ring-shape wall 13.

The operator may, with his or her finger top, push the key top 2a at any position among the top, bottom, left and right in FIG. 1 positions thereof downward in FIG. 2. Then, the pushed position of the key top 2a moves downward and thus the corresponding contact pushing portion 21 pushes the corresponding rubber contact 51. Then, the elastic body 5 is transformed by the pushing by means of the contact pushing portion 21 so that the rubber contact 51 moves downward in FIG. 2.

Thus, the key-top member 2 is tilted and thus the supported portion 22 moves downward in FIG. 2. Thus, the supported portion 22 comes in contact with the top of the supporting member 3. Thus, the key-top member 2 is further tilted about the supporting member 3. In this tilting, the position, of the key-top member 2, on which position the operator is pushing, lowers in FIG. 2 so as to become lower than the other positions.

Thus, the lowering contact portion 21, corresponding to the above-mentioned lowering position of the key-top member 2, pushes the corresponding rubber contact 51. Thus, this rubber contact 51 lowers accordingly so as to come in contact with the corresponding contact portion provided on the circuit substrate 4. Thus, for example, as mentioned above, the corresponding two separate contacts become short-circuited.

As mentioned above, this control-key mechanism 100 may be used in, for example, a video game apparatus. In this case, the control-key mechanism is used to control movement of a character displayed on the screen, as mentioned above. The electrical circuits formed on the circuit substrate 4 may be made so that the above-mentioned four kinds of electrical circuits on the circuit substrate 4 may respectively correspond to the four moving directions, that is, the top, bottom, left and right on the screen, of the character displayed on the screen. These four kinds of electrical circuits may be respectively established as a result of the corresponding four positions, that is, the top, bottom, left and right in FIG. 1 of the key-top member 2, being pushed by the operator. That is, for example, when the operator pushes the top position of the key-top member 2, the corresponding electrical circuit on the circuit substrate 4 is then established, the character on the screen then moving in the top direction. Similarly, the operator may move the character displayed on the screen in any direction among the top, bottom, left and right on the screen.

The operator may push both the top and bottom positions or may push both the left and right positions among the four positions, that is, the top, bottom, left and right positions in FIG. 1 of the key-top member 2. However, even with such a pushing operation being performed by the operator, the construction of the control-key mechanism 100 does not allow the following state to be established. This state is that the corresponding two contact portions, provided on the circuit substrate 2, are respectively simultaneously in contact with by the corresponding two rubber contacts 51 and 51.

This is because, the supporting member 3 is located between these two corresponding rubber contacts 51 and 51. These two rubber contacts 51 and 51 respectively correspond to the top and bottom in FIG. 1 positions of the key-top member 2 or respectively correspond to the left and right positions of the key-top member 2. Thus, in the case where the operator pushes the above-mentioned both positions of the key-top member 2 simultaneously, the key-top member 2 moves downward in FIG. 2 substantially without tilting. Then, the bottom surface 22b of the supported portion 22 comes in contact with the top of the supporting member 3. The key-top member 2 cannot further move downward because the supporting member 2 stops, via the supported portion 22, any further movement of the key-top member 2. Thus, without tilting of the key-top member 2, any of the rubber contacts 51, 51, 51 and 51 cannot come in contact with the contact portion provided on the circuit substrate 4.

When the operator stops pushing the position of the key-top member 2, that is, the finger top of the operator is removed from the key-top member 2, then the lowering of the key-top member 2 is released. This is because, the elastic restoring force of the elastic body 5 has been pushing the key-top member 2. That is, the rubber contacts 51, 51, 51 and 51 have been respectively pushing the contact pushing portions 21, 21, 21 and 21.

Thus, the position and attitude of the key-top member 2 have been returned to those such as in which the key-top member 2 was before the operator had applied force thereon.

Further, in the example of the control-key mechanism 100 being applied on the video game apparatus as mentioned above, the operator may move the character displayed on the screen not only in any one direction among the four directions, that is, the top, bottom, left and right. The operator may also move the character in other four oblique directions, that is, the top-left, top-right, bottom-left and bottom-right.

To achieve each of these four oblique-direction movements of the character, the operator may pushes the corresponding oblique-direction position of the key-top member 2 in FIG. 1. Alternatively, the operator may push both the corresponding positions thereof. For example, to achieve the top-right direction-movement of the character, the operator may push the top-right in FIG. 1 position of the key-top member 2. Alternatively, the operator may push both the top and right positions thereof. Then, the corresponding top-right position of the key-top member 2 then lowers in FIG. 2 accordingly. Thus, both the top position and the right position in FIG. 1 of the key-top member 2 respectively lowers in FIG. 2.

Thus, the key-top member 2 is tilted accordingly and thus the supported portion 22 moves downward in FIG. 2. Thus, the supported portion 22 comes in contact with the top of the supporting member 3. Thus, the key-top member 2 is further tilted about the supporting member 3. In this tilting, both the top and right positions, of the key-top member 2, on the top-right direction position between which top and right positions the operator is pushing, lowers in FIG. 2 so as to become lower than the other two positions, that is, the bottom and left positions.

Thus, the lowering contact portions 21 and 21, corresponding to the above-mentioned lowering positions of the key-top member 2, pushes the corresponding rubber contacts 51 and 51. Thus, these rubber contacts 51 and 51 lower accordingly so as to come in contact with the corresponding contact portions provided on the circuit substrate 4. Thus, the two kinds of circuits on the circuit substrate 4 are established. Then, the character displayed on the screen of the video game apparatus moves in both the corresponding top and right directions simultaneously, that is, the character moves in the corresponding oblique top-right direction.

Similarly, the operator may move the character in any direction among the four oblique directions, that is, the top-right, top-left, bottom-right and bottom left.

As mentioned above, the supporting member 3 is made of a steel made ball. Thus, it is easy to manufacture the supporting member 3 as being an highly accurate sphere shape. Thus, such highly accurate sphere shaped supporting member 3 enables the same operating feeling in manipulation of the key-top member 2 in the various directions' movement or tilting of key-top member 2 about the supporting member 3.

Figure 7A:
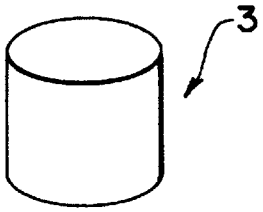
FIGS. 7A, 7B and 7C show various alternative shapes for the supporting member shown in FIG. 2.

In this embodiment, that is, of the control key mechanism 100, the sphere shaped supporting member 3 is used and the bottom surface 22b of the supported portion 22 has the plane surface. Thus, in this case, the supported portion 22 comes in contact with the supporting member 3 at only one point. However, a short cylindrical shape, as shown in FIG. 7A, may be used as a supporting member instead of the supporting member 3. In this case, the short cylindrical shaped supporting member has the central axis preferably identical to that of the key-top member 2. Further, the short cylindrical shaped supporting member has a circular shaped flat end facing toward the bottom surface of the supported portion 22. The surface area of the flat end is smaller than the area of the bottom surface 22b of the supported portion 22. Thus, when the bottom surface 22b of the supported portion 22 comes in contact with the top surface of the short cylindrical shaped supporting member, any position of the peripheral edge of the top surface of the supporting member may come in contact with the bottom surface 22b of the supported portion 22.

In the case where the short cylindrical shaped supporting member is used, the corresponding control-key mechanism may operates as follows. In certain positions of the key-top member 2, the bottom surface 22b of the supported portion 22 comes in contact with the corresponding position of the peripheral edge of the top surface of the short cylindrical shaped supporting member. Then, the position where the supported portion 22 comes in contact with the supporting member acts as the supporting point about which the key-top member 2 tilts according to the pushing operation being performed by the operator.

While the key-top member 2 tilts in the various directions depending on the operation being performed thereon by the operator, the operation feeling there felt by the operator is identical. This is because, the top surface, having the circular shape, of the short cylindrical shaped supporting member thus has the axial symmetrical shape. Thus, while the supported portion 22 comes in contact with various positions of the peripheral edge of the top surface of the supporting member, the condition of this contact with is uniform.

Figure 7C:
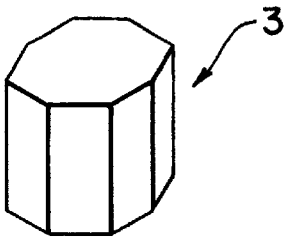
Figure 7B:
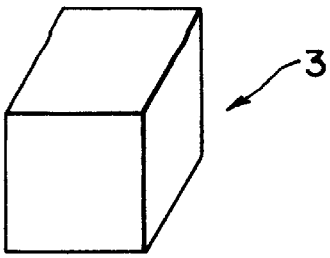

Further, a square pole shape, as shown in FIG. 7B, is used instead of the cylindrical shaped supporting member only for four-direction control, that is, in the above-mentioned example in the video game apparatus, the top, bottom, left and right directions' movements. Furthermore, an octagonal pole shape, as shown in FIG. 7C, is used instead of the cylindrical shaped supporting member for eight-direction control, that is, in the above-mentioned example in the video game apparatus, the top, bottom, left, right, top-right, top-left, bottom-right and bottom-left directions' movements. In both the cases, the central axes of the poles are preferably identical to that of the key-top member 2 and any position of the peripheral edges of the top surfaces' thereof may respectively come in contact with the bottom surface 22b of the supported portion 22, similarly to the case of the cylindrical shaped supporting member. Further, in each of these cases, the supported portion 22 comes in contact with the pole as the supporting member at the corresponding line as the edge of the square or octagonal.

Furthermore, any shape is allowed to be used instead of the supporting member 3 when the shape allows the following condition. While the supported portion 22 comes in contact with predetermined-direction positions of the peripheral edge of the top surface of the supporting member, the condition of this is uniform. Thus, while the key-top member 2 tilts in the desired-direction positions, the contact condition between the supported portion 22 and the supporting member is uniform.

In the present invention, for example, the above-mentioned embodiment has the construction in which in response to a pushing operation performed by an operator the control-key mechanism 100 operates as follows. First, the key-top member 2 lowers. Thus, the key-top member 2 comes in contact with the supporting member 3. Then, second, the key-top member 2 tilts about the supporting member 3.

Thus, by the above two-steps movements, that is, the lowering movement and the tilting movement of the key-top member 2, the operator may feel modulation in mechanical response from the key-top member 2. Such modulation in mechanical response is needed in control, for example, of the character's movement in the above-mentioned example of the video game apparatus. This is because, if no clear response is offered from a control key when the key is operated by an operator, the operator wonder whether or not his or her operation is effective in control, for example, of the character's movement.

Such mechanical response can be improved by the elastic restoring force offered by the elastic body in response to the operator's pushing operation.

Further, the present invention's construction can offer a uniform operation feeling while the operator operates the key-top member in various relevant directions. This is because, the supporting member has an axial symmetrical shape. That is, the parts of the supporting member, which parts respectively face the various relevant directions, have identical shapes.

The background regarding the control-key mechanism 200 according to the second embodiment of the present invention will now be described.

The control-key mechanism 200 has been invented so as to eliminate the following drawbacks existing in the control-key mechanism 100. That is, as mentioned above, in the control-key mechanism 100, the spherical shaped supporting member 3 is supported in the supporting portion 52 of the elastic body 5. In this construction, the spherical shaped supporting member 3 may move there while the supporting member 3 is pushed by means of the supported portion 2 as a result of the operator pushing the key-top member 2.

As a result, the supporting member 2 may move aside, that is, it may move in the direction along the pushing-force direction. That is, in FIG. 2, if the right side of the key-top member 2 is pushed, the supporting member 3 may move leftward accordingly.

In the case of occurrence of such movement of the supporting member 2, not only the relevant rubber contact 51 but also the other rubber contact(s) 51 adjacent to the relevant one may come in contact with the corresponding contact portions provided on the circuit substrate 4. As a result, in the above-mentioned example in the video game apparatus, the character may move in an undesired direction.

Another drawback in the control-key mechanism 100 will now be described. ABS (Acrylonitrile Butadiene Styrene) resin is preferable to used as material of the key-top member 2. However, ABS resin has inferior abrasion resistance. The supported portion 22 as a part of the key-top member 2 frequently comes in contact with the supporting member 3 preferably made of steel according to frequent operation of the control-key mechanism 100, especially in the above-mentioned example in the video game apparatus.

Such frequent coming in contact with the steel made supporting member 3 results in abrasion occurring in the bottom surface 22b of the supported portion 22, as the counterpart, made of ABS resin. As a result, the mechanical response property in the control-key mechanism 100 become degraded. Thus, the life of the control-key mechanism 100 is shortened.

Nylon resin is preferable to be used as material of the key-top member 2 because nylon resin has a superior abrasion resistance. However, nylon resin has a shrinkage character in its molding step. This shrinkage character in its molding step is such that nylon resin shrinks in its molding step depending on ambient temperature, humidity, and depending on factors regarding cooling water used in the used molding equipment. It is difficult to maintain such various conditions in its molding without regarding the molding time being day time or night time.

Such shrinkage character appears especially in thickness of the construction. Thus, as a result of using nylon resin as material of the key-top member 2, many products of control-key mechanisms such as the control-key mechanism 100 have the same problem. This problem is that spaces between the bottom surfaces 22b of the supported portions 22 and the tops of the supporting members 3 respectively exceed the allowable limit. If such products having the problem were used, both the rubber contacts 51 and 51 located opposite to each other, that is, for example, the left and right rubber contacts 51 and 51 in FIG. 2, would simultaneously come in contact with the corresponding contact portions provided on the circuit substrate 4. Thus, such products cannot be used.

The control-key mechanism 200 according to the second embodiment of the present invention has been invented so as to eliminate the above problems. The first problem is that the supporting member 2 moves aside when the supported portion 22 pushes the supporting member 2. The second problem is that excessive shrunk nylon-resin key-top member 2 creates a control-key mechanism which cannot be used.

Figure 3:
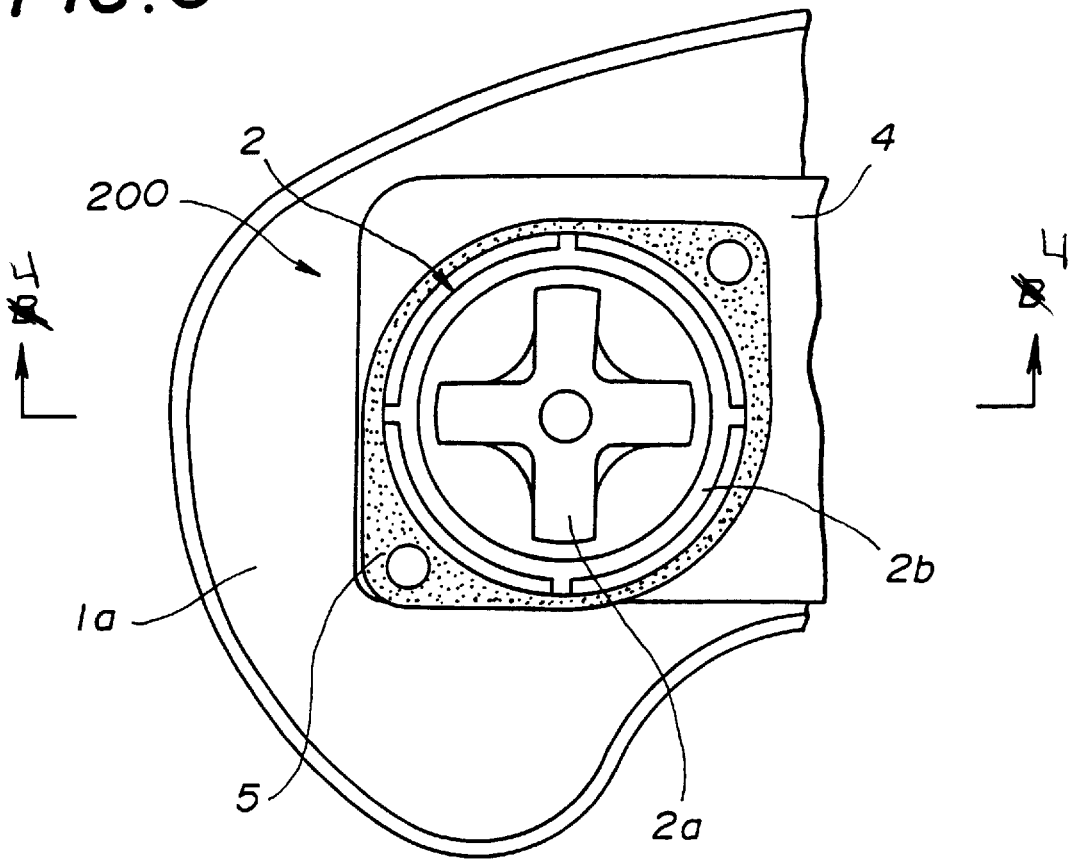
FIG. 3 shows a plan view of a control-key mechanism according to a second embodiment of the present invention, without an upper housing.

The control-key mechanism 200 according to the second embodiment of the present invention will now be described with reference to FIGS. 3 to 5.

This control-key mechanism 200 has a construction identical to the construction of the control-key mechanism 100, according to the first embodiment of the present invention and described above, except for a shape of the bottom, in FIG. 4, surface 22Ab of the supported portion 22A. Thus, the substantially same elements in the mechanism 200, as those in the mechanism 100, respectively have the same reference numerals as those of the elements in the mechanism 100. Further, the description of the constructions and the corresponding operations for the control-key mechanism 200 will thus be omitted, except for those associated with the supported portion 22A and except for the description using FIG. 5.

Figure 5:
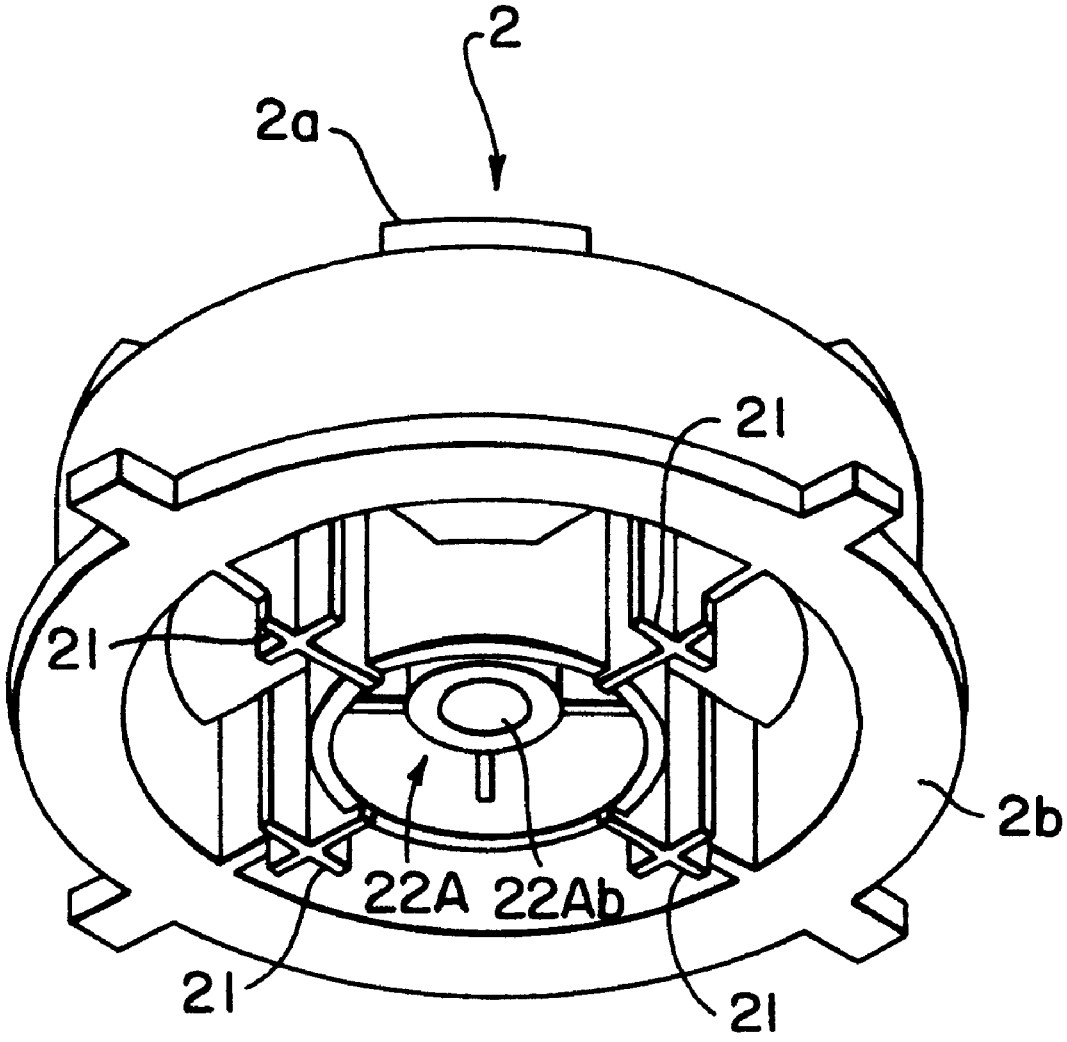
FIG. 5 shows a perspective view of a key-top member of the control-key mechanism shown in FIG. 4, viewed from the bottom-side oblique direction, that is, in the direction C in FIG. 4.

The control-key mechanism 100 may also have a construction similar to that as shown in FIG. 5 excepting the construction associated with the bottom surface 22Ab.

Figure 4:
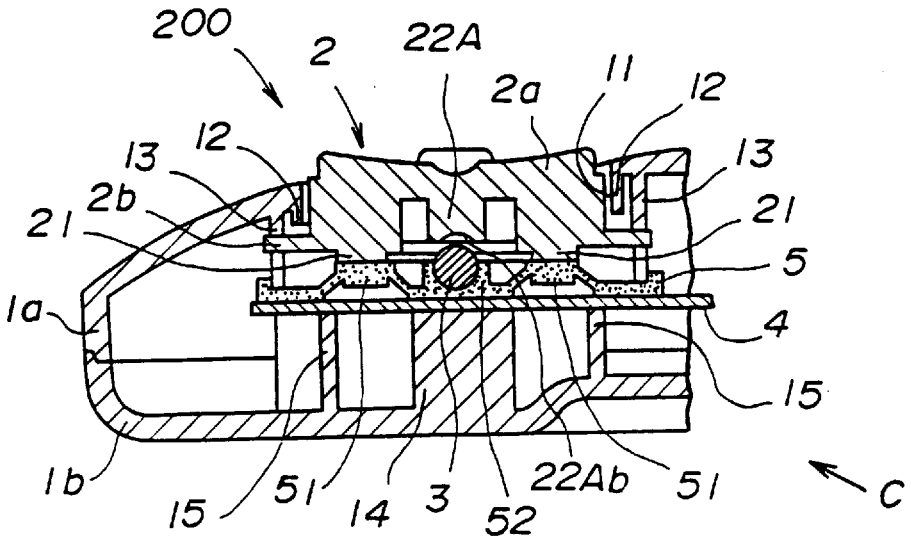
FIG. 4 shows a sectional view of the control-key mechanism shown in FIG. 3 taken along the line 4—4 in FIG. 1, the sectional view including the upper housing while the plane view shown in FIG. 3 is a view in which the upper housing has been removed.

As shown in FIG. 5, each of the four contact pushing portions 21, 21, 21 and 21 has walls forming a cross shape when viewed from the bottom in FIG. 4.

The bottom surface 22Ab of the supported portion 22A will now be described with reference to FIGS. 4 and 5. This bottom surface 22Ab has a plane periphery and a concaved center. This concaved center has substantially a partial sphere shape. That is, this concavity has a shape as an inner surface of a partial sphere.

This partial sphere as the concavity of the bottom surface 22Ab is identical to an inner surface of a partial sphere as mentioned above. The diameter of this partial sphere is slightly larger than that of the sphere of the supporting member 3. As shown in FIG. 4, the vertical thickness of the key-top member 2 at the position of the concavity of the bottom surface 22Ab is relatively large. Thus, in the case where nylon resin is used as material of the key-top member 3, in its molding step, this thickness may partially shrink due to the above-mentioned shrinkage character of nylon resin. That is, as a result, a part of the surface of the concavity of the bottom surface 22Ab may be further concaved.

However, while the key-top member 2 is being pushed downward in FIG. 2, then the bottom surface 22Ab is in contact with the supporting member 3 surface to surface. That is, not only a point but also an area of the concavity of the bottom surface 22Ab is in contact with not only a point but also an area of the surface of the supporting member 3. Thus, the above-mentioned partial shrinkage of the thickness associated with the concavity of the bottom surface 22Ab, which shrinkage may occur in its molding step, may not affect the mechanical relationship between the supporting member 3 and the bottom surface 22Ab of the supported portion 22A. This is because a remaining part of the concavity effects to ensure the proper relationship between the supporting member 3 and the bottom surface 22Ab.

As mentioned above, instead of the point contact between the supported portion 22 and the supporting member 3 in the control-key mechanism 100, the control-key mechanism 200 uses the area contact or the surface contact. This area contact or surface contact is formed between the supported portion 22A and the supporting member 3 when the key-top member 2 is pushed. The area contact is formed due to the specific shape of the concavity of the bottom surface 22Ab as mentioned above.

This area contact may also eliminate the above-mentioned other drawback that the supporting member 3 moves aside as a result of the supporting member 3 being biassed by means of the supported portion 22 in the control-key mechanism 100, as mentioned above. This is because, that area contact of the partial sphere shape is effective to reduce the biassed force being applied to the supporting member 3, which force may cause the aside movement of the supporting member 3.

Further, the present invention is not limited to the above described embodiments, and variations and modifications may be made without departing from the scope of the present invention.

What is claimed is:

1. A control-key device *for use with a game device such as a video game* comprising:

a housing member having an opening;

a substrate with [at least a pair] *two pairs* of electrode portions formed thereon, each of said electrode portions having a pair of separate contacts;

[a] *two pairs of* movable contact [which is] *members* formed [with respect to each of the] corresponding *to*

*said pairs of* electrode portions, *each of said movable contact members including a movable contact and an elastic member, the combination of the electrode portion, the movable contact and the elastic portion at each of said movable contact members being arranged so that* said movable contact [being] *is* positioned spacedly from the corresponding electrode portion and movably supported on said substrate by [an] *the corresponding* elastic member *and* so that said movable contact comes in contact with the corresponding electrode portions to cause said pair of separate contacts to short-circuit *so as to supply a signal to the game device for controlling the progress of a video game* when a downward movement is applied to said movable contact *member*;

a supporting member [formed on] *disposed upon* said substrate at the middle portion [between said pair of] *surrounded by said pairs of* electrode portions; and a key-top member having a first [surface] *portion* and a second [surface] *portion* and positioned so that said first [surface] *portion* is exposed outside of said housing member through said opening and said second [surface is closely spaced from] *portion is facing* said supporting member, said key-top member further comprising portions contacting said movable [contacts] *contact members*, said key-top member *and said movable contact members* being arranged so that *said key-top member is maintained in a level position with the second portion thereof spaced from said supporting member in the absence of a manipulating force on said key-top member and wherein* said second [surface] *portion* of said key-top member contacts said supporting member when a downward movement is applied to said key-top member.

2. The control-key device according to claim 1, wherein said supporting member [is] *comprises* a [metal ball] *conducting member having a curvilinear surface* and is supported on said substrate through [a] *an* elastic member.

3. The control-key device according to claim 2, wherein said second [surface] *portion* of said key-top member has a concave shape corresponding to the shape of the top surface of said metal ball with which said key-top member comes into contact.

4. The control-key device according to claim 1, wherein said second [surface] *portion* of said key-top member has a flat plane at the portion facing said supporting member.

5. The control-key device according to claim 1, wherein said second [surface] *portion* of said key-top member has a concavity at the portion facing said supporting member.

6. The control-key device according to claim 5, wherein said supporting member has a shape such that said supporting member may fit into said concavity of said key-top member and said key-top member may tilt in at least one predetermined direction while said supporting member is located in said concavity.

7. The control-key device according to claim 1, wherein said second [surface] *portion* of said key-top member and said supporting member respectively have constructions such that, while said key-top member tilts in a predetermined plurality of directions respectively, conditions in which said second surface is in contact with said supporting member are uniform.

8. The control-key device according to claim 1, wherein said supporting member has an at least partially spherical shape.

9. The control-key device according to claim 8, wherein said second [surface] *portion* of said key-top member has a partial spherical concave shape, a diameter of the sphere of which partially spherical concave shape is slightly larger than a diameter of the sphere of said at least partially spherical shape of said supporting member.

10. The control-key device according to claim 1, wherein said supporting member has an at least partially cylindrical shape.

11. The control-key device according to claim 1, wherein said supporting member has an at least partially square pole shape.

12. The control-key device according to claim 1, wherein said supporting member has an at least partially octagonal pole shape.

13. The control-key device according to claim 1, wherein said second [surface] *portion* of said key-top member has a concavity of at least a partially spherical shape and said supporting member has an at least a partially spherical shape; and wherein said concavity of at least partial spherical shape of said second [surface] *portion* is a shape such that said at least a partially spherical shape of said supporting member may substantially precisely fit into said concavity of at least a partially spherical shape of said second [surface] *portion*.

14. The control-key device according to claim 1, further comprising direction maintaining means for maintaining a direction of said key-top member so as to prevent said key-top member from tilting and so as to prevent the [pair] *different pairs* of separate contacts of said substrate from being short-circuited as a result of the tilting of said key-top member even though no operating force is applied thereto.

15. The control-key device according to claim 14, wherein said direction maintaining means maintains a direction of said key-top member so as further to maintain a space between said second [surface] *portion* of said key-top member and said supporting member while no operating force is applied to said key-top member.

16. The control-key mechanism according to claim 1, wherein said key-top member tilts on said supporting member in response to the downward movement being applied to said key-top member, the tilting direction of said key-top member depending on a direction in which the downward movement is applied to said key-top member, and different directions of the tilting of said key-top member causes corresponding different pairs of separate contacts to be short-circuited respectively.

17. A control-key device *for use with a game device such as a video game* comprising:

a housing member having an opening;

a substrate with two pairs of electrode members formed and located at symmetrical positions on an imaginary circle thereon, each of said electrode members having a pair of separate contracts;

an elastic member placed on said substrate [and], *said elastic member* having two pairs of *resiliently movable portions with* movable [contact portions] *contacts* corresponding to said two pairs of electrode members, which movable [contact portions] *contacts* are positioned spacedly from the corresponding electrode members and arranged so that one of said movable contacts to which a downward movement is applied comes into contact with the corresponding one of said electrode members to cause the relevant pair of separate contacts thereof to short-circuit *so as to supply a signal to the game device for controlling the progress of a video game*;

a supporting member [formed on] *disposed upon* said substrate at the center portion of said imaginary circle; and a key-top member having a first [surface] *portion* and a second [surface] *portion* and positioned so that said first [surface] *portion* is exposed outside of said housing member through said opening and said second [surface is closely spaced from] *portion is facing* said supporting member, said key-top member further comprising portions contacting said *resiliently* movable [contacts] *portions*, said key-top member *and said resiliently movable portions* being arranged so that *said key-top member is maintained in a level position with the second portion thereof spaced from said supporting member in the absence of a manipulating force on said key-top member and wherein* said second [surface] *portion* of said key-top member contacts said supporting member when a downward movement is applied to said key-top member.

18. The control-key device according to claim 17, wherein said key-top member has a bottom peripheral disk and said housing member has a ring member encircling said opening and extending to said bottom peripheral disk and arranged so that at a state free of downward movement of said key-top member said bottom peripheral disk contacts said ring member.

19. The control-key device according to claim 17, wherein said elastic member has a depression at a position corresponding to said center portion of the imaginary circle of said substrate and said supporting member is formed on said substrate so that said supporting member is placed partially in said depression, a top portion of said supporting member protruding out of said elastic member toward said key-top member, and a bottom portion of said supporting member being supported by said elastic member on said substrate.

20. The control-key device according to claim 17, wherein:

said supporting member is placed on said elastic member elastically supporting said key-top member so as to maintain a direction of said key-top member; and wherein the operating force which being applied to said first [surface] *portion* of said key-top member causes, against an elastic force applied by said elastic member, said key-top member to tilt with respect to said supporting member while said supporting member supports said key-top member at a supporting point where said supporting member is in contact with said second [surface] *portion* of said key-top member, about which supporting point said key-top member tilts; and wherein the tilting of said key-top member, with respect to said supporting member, causes said movable contact portions of said elastic member to come in contact with said electrode members of said substrate so as to cause the pair of separate contacts thereof to short-circuit.

21. A control-key device *for use with a game device such as a video game* comprising:

a substrate with at least a pair of electrode members formed on a surface thereof and a center position defined at said surface between said pair of electrode members, said pair of electrode members being located symmetrically with respect to said center position;

an elastic member placed on said substrate, said elastic member comprising a depression on said center position of said substrate and at least a pair of protuberant portions on said electrode member, each of said protuberant portions having an electrical contact facing toward but closely spaced from the corresponding one of said electrode members so as to operate as a movable contact member against the corresponding electrode member;

a metal member placed partially buried in said depression, supported by said substrate at said center position with the portion of said elastic member located between said metal member and said substrate, and protruding from the surface of said elastic member;

a key-top member having a first surface and a second surface, said key-top member comprising at least a pair of first portions contacting the corresponding protuberance portions of said elastic member, a second portion defined at said second surface and facing [but closely spaced from] the protruding portion of said metal member, and at least a pair of fringe portions positioned substantially symmetrically with respect to the second portion of said key-top member*, said key-top member and said protuberant portions of said elastic member being arranged so that said key-top member is maintained in a level position by said protuberant portions with the second portion thereof spaced from said metal member when no downward force is applied to the first surface of said key-top member*; and a housing member having an opening [position] *portion* and at least a pair of stopper portions corresponding to said pair of fringe portions of said key-top member, said housing member being positioned so that said first surface of said key-top member is exposed outside of said housing member and said stopper [positions] *portions* contact the corresponding fringe portions when [downward movement is not applied to] said key-top member [at] *does not receive a downward force on* its first surface.

* * * * *